US007904361B2

(12) United States Patent
Lawrence

(10) Patent No.: US 7,904,361 B2
(45) Date of Patent: Mar. 8, 2011

(54) RISK MANAGEMENT CUSTOMER REGISTRY

(75) Inventor: David Lawrence, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1976 days.

(21) Appl. No.: 10/463,918

(22) Filed: Jun. 18, 2003

(65) Prior Publication Data
US 2004/0078321 A1 Apr. 22, 2004

Related U.S. Application Data

(63) Continuation-in-part of application No. 10/074,584, filed on Feb. 12, 2002, now abandoned, which is a continuation-in-part of application No. 10/021,124, filed on Oct. 30, 2001, now abandoned, which is a continuation-in-part of application No. 09/812,627, filed on Mar. 20, 2001.

(60) Provisional application No. 60/392,989, filed on Jul. 1, 2002.

(51) Int. Cl.
G06Q 40/00 (2006.01)
(52) U.S. Cl. .......... 705/35; 705/36 R; 705/36 T; 705/37; 705/38
(58) Field of Classification Search ............... 705/35–38
See application file for complete search history.

(56) References Cited

U.S. PATENT DOCUMENTS

| 4,326,259 A | 4/1982 | Cooper et al. |
|---|---|---|
| 4,346,442 A | 8/1982 | Musmanno |
| 4,376,978 A | 3/1983 | Musmanno |
| 4,597,046 A | 6/1986 | Musmanno et al. |
| 4,718,009 A | 1/1988 | Cuervo |
| 4,727,243 A | 2/1988 | Savar |
| 4,734,564 A | 3/1988 | Boston et al. |
| 4,736,294 A | 4/1988 | Gill et al. |
| 4,774,663 A | 9/1988 | Musmanno et al. |
| 4,774,664 A | 9/1988 | Campbell et al. |
| 4,812,628 A | 3/1989 | Boston et al. |
| 4,868,866 A | 9/1989 | Williams, Jr. |
| 4,914,587 A | 4/1990 | Clouse |
| 4,953,085 A | 8/1990 | Atkins |
| 4,989,141 A | 1/1991 | Lyons et al. |
| 5,025,138 A | 6/1991 | Cuervo |

(Continued)

FOREIGN PATENT DOCUMENTS

EP    1 137 209 A2    9/2001

(Continued)

OTHER PUBLICATIONS

"Specially designated Who? A Primer on OFAC Compliance" ABA Bank Compliance Mar./Apr. 1996, pp. 29-36.*

(Continued)

Primary Examiner — Narayanswamy Subramanian
(74) Attorney, Agent, or Firm — Chadbourne & Parke LLP; Walter G. Hanchuk

(57) ABSTRACT

Methods and systems are provided for managing Risk associated with a financial account initiated by an intermediary institution. Risk related information descriptive of a customer of the intermediary can be registered with a neutral entity and a certification can be generated that is associated with the customer and includes the registered information. An instruction can be received to convey the certification associated with the customer to a Primary Financial Institution after which the certification can be conveyed to the Primary Financial Institution.

9 Claims, 8 Drawing Sheets

U.S. PATENT DOCUMENTS

| | | |
|---|---|---|
| 5,038,284 A | 8/1991 | Kramer |
| 5,068,888 A | 11/1991 | Scherk et al. |
| 5,161,103 A | 11/1992 | Kosaka et al. |
| 5,177,342 A | 1/1993 | Adams |
| 5,210,687 A | 5/1993 | Wolfberg et al. |
| 5,239,462 A | 8/1993 | Jones et al. |
| 5,274,547 A | 12/1993 | Zoffel et al. |
| 5,323,315 A | 6/1994 | Highbloom |
| 5,347,632 A | 9/1994 | Filepp et al. |
| 5,398,300 A | 3/1995 | Levey |
| 5,444,819 A | 8/1995 | Negishi |
| 5,446,885 A | 8/1995 | Moore et al. ............. 707/103 R |
| 5,448,047 A | 9/1995 | Nair et al. |
| 5,457,305 A | 10/1995 | Akel et al. |
| 5,557,518 A | 9/1996 | Rosen |
| 5,627,886 A | 5/1997 | Bowman |
| 5,649,116 A | 7/1997 | McCoy et al. |
| 5,679,938 A | 10/1997 | Templeton et al. |
| 5,679,940 A | 10/1997 | Templeton et al. |
| 5,696,907 A | 12/1997 | Tom |
| 5,704,045 A | 12/1997 | King et al. |
| 5,717,923 A | 2/1998 | Dedrick |
| 5,732,397 A | 3/1998 | DeTore et al. |
| 5,787,402 A | 7/1998 | Potter et al. |
| 5,790,639 A | 8/1998 | Ranalli et al. |
| 5,797,133 A | 8/1998 | Jones et al. |
| 5,819,226 A | 10/1998 | Gopinathan et al. |
| 5,819,236 A | 10/1998 | Josephson |
| 5,852,812 A | 12/1998 | Reeder |
| 5,875,431 A | 2/1999 | Heckman et al. |
| 5,878,400 A | 3/1999 | Carter, III |
| 5,884,289 A * | 3/1999 | Anderson et al. ............... 705/44 |
| 5,940,843 A | 8/1999 | Zucknovich et al. |
| 5,963,923 A | 10/1999 | Garber |
| 5,991,743 A | 11/1999 | Irving et al. ................... 705/36 |
| 6,014,228 A | 1/2000 | Castro |
| 6,016,963 A | 1/2000 | Ezawa et al. |
| 6,018,723 A | 1/2000 | Siegel et al. |
| 6,021,397 A | 2/2000 | Jones et al. |
| 6,078,904 A | 6/2000 | Rebane |
| 6,078,905 A | 6/2000 | Pich-LeWinter |
| 6,085,175 A | 7/2000 | Gugel et al. |
| 6,088,686 A | 7/2000 | Walker et al. ................... 705/38 |
| 6,119,103 A | 9/2000 | Basch |
| 6,148,301 A | 11/2000 | Rosenthal |
| 6,199,073 B1 | 3/2001 | Peairs et al. |
| 6,205,433 B1 | 3/2001 | Boesch et al. |
| 6,219,805 B1 | 4/2001 | Jones et al. |
| 6,246,996 B1 | 6/2001 | Stein |
| 6,249,770 B1 | 6/2001 | Erwin et al. |
| 6,278,983 B1 | 8/2001 | Ball |
| 6,289,320 B1 | 9/2001 | Drummond et al. |
| 6,304,973 B1 | 10/2001 | Williams |
| 6,317,727 B1 | 11/2001 | May |
| 6,321,212 B1 | 11/2001 | Lange |
| 6,330,546 B1 | 12/2001 | Gopinathan et al. |
| 6,341,267 B1 | 1/2002 | Taub |
| 6,347,307 B1 | 2/2002 | Sandhu et al. |
| 6,393,423 B1 | 5/2002 | Goedken |
| 6,456,984 B1 | 9/2002 | Demoff et al. |
| 6,609,114 B1 * | 8/2003 | Gressel et al. ................... 705/50 |
| 6,658,393 B1 * | 12/2003 | Basch et al. ..................... 705/38 |
| 6,658,400 B2 * | 12/2003 | Perell et al. ...................... 707/1 |
| 6,738,760 B1 | 5/2004 | Krachman |
| 6,757,898 B1 * | 6/2004 | Ilsen et al. ..................... 709/203 |
| 6,785,661 B1 | 8/2004 | Mandler et al. |
| 6,898,574 B1 * | 5/2005 | Regan .............................. 705/38 |
| 6,915,265 B1 * | 7/2005 | Johnson ........................... 705/2 |
| 6,915,271 B1 * | 7/2005 | Meyer et al. ..................... 705/14 |
| 6,985,886 B1 * | 1/2006 | Broadbent et al. .............. 705/38 |
| 7,003,661 B2 * | 2/2006 | Beattie et al. ................. 713/156 |
| 7,006,992 B1 | 2/2006 | Packwood |
| 7,114,177 B2 * | 9/2006 | Rosenberg et al. ............. 726/4 |
| 7,120,929 B2 * | 10/2006 | Beattie et al. ..................... 726/6 |
| 7,133,846 B1 * | 11/2006 | Ginter et al. ..................... 705/54 |
| 7,167,844 B1 * | 1/2007 | Leong et al. ..................... 705/80 |
| 7,181,428 B2 | 2/2007 | Lawrence |
| 7,209,889 B1 * | 4/2007 | Whitfield ......................... 705/14 |
| 7,426,489 B2 * | 9/2008 | van Soestbergen et al. .... 705/37 |
| 7,426,492 B1 | 9/2008 | Bishop et al. |
| 7,523,054 B2 * | 4/2009 | Tyson-Quah ................... 705/35 |
| 7,552,466 B2 * | 6/2009 | Rosenberg et al. .............. 726/4 |
| 7,562,212 B2 * | 7/2009 | Beattie et al. ................. 713/156 |
| 7,593,892 B2 * | 9/2009 | Balk et al. ........................ 705/38 |
| 7,694,135 B2 * | 4/2010 | Rowan et al. ................. 713/166 |
| 7,711,950 B2 * | 5/2010 | Orbke et al. ................... 713/155 |
| 2001/0011243 A1 | 8/2001 | Dembo et al. |
| 2001/0027388 A1 | 10/2001 | Beverina et al. |
| 2001/0027389 A1 | 10/2001 | Beverina et al. |
| 2001/0037318 A1 * | 11/2001 | Lindskog et al. ................ 705/78 |
| 2001/0047279 A1 | 11/2001 | Gargone |
| 2001/0047347 A1 * | 11/2001 | Perell et al. ....................... 707/1 |
| 2001/0049651 A1 | 12/2001 | Selleck |
| 2001/0054020 A1 | 12/2001 | Barth et al. |
| 2001/0056359 A1 | 12/2001 | Abreu |
| 2002/0016854 A1 | 2/2002 | Hirasawa et al. |
| 2002/0019804 A1 | 2/2002 | Sutton |
| 2002/0029249 A1 * | 3/2002 | Campbell et al. ............. 709/206 |
| 2002/0032635 A1 | 3/2002 | Harris et al. |
| 2002/0032646 A1 | 3/2002 | Sweeney et al. |
| 2002/0032665 A1 | 3/2002 | Creighton et al. ............... 706/76 |
| 2002/0035520 A1 * | 3/2002 | Weiss .............................. 705/27 |
| 2002/0046053 A1 | 4/2002 | Hare et al. |
| 2002/0087454 A1 | 7/2002 | Calo et al. |
| 2002/0087455 A1 | 7/2002 | Tsagarakis et al. |
| 2002/0091635 A1 | 7/2002 | Dilip et al. |
| 2002/0091706 A1 | 7/2002 | Anderson et al. |
| 2002/0099640 A1 | 7/2002 | Lange |
| 2002/0103747 A1 | 8/2002 | Lawrence |
| 2002/0103852 A1 * | 8/2002 | Pushka ......................... 709/203 |
| 2002/0111890 A1 | 8/2002 | Sloan et al. |
| 2002/0138371 A1 | 9/2002 | Lawrence et al. |
| 2002/0138407 A1 | 9/2002 | Lawrence et al. |
| 2002/0138408 A1 | 9/2002 | Lawrence |
| 2002/0143562 A1 | 10/2002 | Lawrence |
| 2002/0143693 A1 * | 10/2002 | Soestbergen et al. ........... 705/37 |
| 2002/0152156 A1 * | 10/2002 | Tyson-Quah ................... 705/38 |
| 2003/0069742 A1 | 4/2003 | Lawrence |
| 2003/0069894 A1 | 4/2003 | Cotter et al. |
| 2003/0074272 A1 | 4/2003 | Knegendorf et al. |
| 2003/0074310 A1 | 4/2003 | Grovit et al. |
| 2003/0167177 A1 | 9/2003 | Branch |
| 2006/0089894 A1 * | 4/2006 | Balk et al. ........................ 705/35 |
| 2007/0061594 A1 * | 3/2007 | Ginter et al. ................... 713/189 |
| 2007/0288355 A1 * | 12/2007 | Roland et al. ................... 705/38 |
| 2008/0320092 A1 * | 12/2008 | Campbell et al. ............. 709/206 |
| 2009/0031127 A1 * | 1/2009 | Campbell et al. ............. 713/158 |
| 2009/0043687 A1 * | 2/2009 | van Soestbergen et al. .... 705/37 |
| 2009/0132813 A1 * | 5/2009 | Schibuk ......................... 713/158 |
| 2009/0187761 A1 * | 7/2009 | Campbell et al. ............. 713/156 |

FOREIGN PATENT DOCUMENTS

| | | |
|---|---|---|
| EP | 1 143 365 A2 | 10/2001 |
| JP | 02000020618 A | 1/2000 |
| JP | 02003050896 A | 2/2003 |
| WO | WO 00/75836 | 12/2000 |
| WO | WO 01/55885 | 8/2001 |

OTHER PUBLICATIONS

"OFAC Compliance: A Perspective for Community Banks", ABA Bank Compliance Nov./Dec. 1998, pp. 39-48.*

"Commentary: Foreign Assets Control Regulations: The Countries Aren't Enough", Letter of Credit Update, Mar. 1996, pp. 23- 27.*

Int'l Preliminary Examination Report from PCT/US03/19242 dated Mar. 31, 2005.

Int'l Search Report from PCT/US03/19242 dated Dec. 3, 2003.

Written Opinion from PCT/US03/19242 dated Jun. 21, 2004.

"Enterprise Anti-Money Laundering Product Specification." *Mantas*, 2001.

"Firms Consider Pact to Track Terror Money." Wall Street Journal, Nov. 26, 2001. cited by other.

"Five Ways to Reduce Risk with Neutral Networks." *Credit Risk Management Report*, vol. 3, Jun. 27, 1993.

"Transforming Discovery Into Opportunity"; "Key Personnel Bios"; "Frequently Asked Questions"; *Mantas*. Mantas, Inc., Announces Funding and Management Team:, *Mantas*, Jun. 4, 2001. "Safeguard and SRA Partner to Launch Mantas, Inc.", *Mantas.*, "Knowledge Discovery Platform"; "Money Laundering Detection for Banks"; "Fraud and Money Laundering Detection for Securities Firms"; "Best Exuecution"; "Equities Trading Compliance", *Mantas*.

Aguais, Scott D. "It's the Economy." *Credit Card Management*, vol. 5, 1993, pp. 58-60.

Banasiak, Michael, "Don't be Out-Scored by Your Competition", *Credit and Financial Management Review*, 2nd Quarter 2000.

Barrett, Jennifer, "Banking on Software Solutions", *Newsweek Web*, Jun. 12, 2002.

Caudill, Maureen et al., "Naturally Intelligent Systems." *The MIT Press*, 1990.

Chandler, Gary "Credit Scoring; A Feasibility Study." *Executive*, 1985.

Everest-Hill, Deborah "Automating Risk Assessment." *The Internal Auditor*, vol. 56, Jun. 1999, pp. 23-25.

Grafton, David. "Analysing Customers With Behavioural Modelling." *Credit Control*, vol. 17, 1996, pp. 27-31.

Gullo, Karen "Neutral Nets Versus Card Fraud; Chase's Software Learns to Detect Potential Crime." *The American Banker*, Feb. 2, 1990.

Healy, Thomas J. "The New Science of Borrower Behavior." *Factiva*, Feb. 1, 1998.

Hicks M., "What, me spam?" Good intentions alone aren't enough to avoid alienating customers, eWeek Sep. 3, 2001, retrieved from DIALOG DIALOG NO.: 08984028, see abstract.

Higgins, Kevin T. "Retention by the Numbers." *Credit Card Management*, vol. S, 1993, pp. 52-S6.

Leonard, Kevin J. And William J. Banks. "Automating the Credit Decision Process." *Journal of Retail Banking*, vol. 16, 1994, p. 39.

McLure, Leslie "Taking the Risk Out of Transactions." *Factiva*, Mar. 1, 1994.

Power, Stephen "Background Checks Await Fliers." *The Wall Street Journal*, Jun. 7, 2002.

Purcell, Lea "Roping in Risk." *Factiva*, May 1, 1994.

Quinn, Jane Bryant "Credit Card Issuers; Keeping a Closer Watch on How You Pay Bills." *Washington Post*, Apr. 25, 1988.

World-Check Search — Vladimir Gusinsky (Russia).

Int'l Search Report dated Feb. 3, 2003 for PCT/US02/07110.

Int'l Search Report dated Oct. 1, 2003 for PCT/US03/03994.

\* cited by examiner

RISK MANAGEMENT CUSTOMER REGISTRY

CROSS REFERENCE TO RELATED APPLICATIONS

This application claims the benefit of the filing date of U.S. Provisional applications No. 60/392,989 entitled "Risk Management Customer Registry", filed Jul. 1, 2002. This application is a continuation-in-part of a prior application entitled "Risk Management Clearinghouse", filed Feb. 12, 2002, and bearing the Ser. No. 10/074,584 now abandoned which is a continuation-in-part of a prior application also entitled "Risk Management Clearinghouse" filed Oct. 30, 2001, and bearing the Ser. No. 10/021,124, now abandoned which is also a continuation-in-part of a prior application entitled "Automated Global Risk Management" filed Mar. 20, 2001, and bearing the Ser. No. 09/812,627, all of which are relied upon and incorporated by reference.

BACKGROUND

This invention relates generally to a method and system for facilitating the identification, investigation, assessment and management of legal, regulatory, financial and reputational risks. In particular, the present invention relates to a computerized system and method for banks and non-bank financial institutions to comply with know your customer requirements associated with a financial transaction initiated by a primary bank on behalf of a customer.

As money-laundering and related concerns have become increasingly important public policy concerns, regulators have attempted to address these issues by imposing increasing formal and informal obligations upon financial institutions. Government regulations authorize a broad regime of record-keeping and regulatory reporting obligations on covered financial institutions as a tool for the federal government to use to fight drug trafficking, money laundering, and other crimes. Such a body of regulation is designed chiefly to assist law enforcement authorities in detecting when criminals are using banks and other financial institution as an intermediary for, or to hide the transfer of funds derived from, criminal activity.

Bank and non-bank financial institutions, including: investment banks; merchant banks; securities firms; any insured bank (as defined in section 3(h) of the Federal Deposit Insurance Act (12 U.S.C. 1813(h)); a commercial bank or trust company; a private banker; credit union; thrift institution; broker dealers; securities and commodities trading firms; asset management companies, hedge funds, mutual funds, credit rating funds, securities exchanges and bourses, institutional and individual investors, law firms, accounting firms, auditing firms, or any institution the business of which is engaging in financial activities as described in section 4(k) of the Bank Holding Act of 1956; may be subject to legal and regulatory obligations to "know your customer" (KYC).

KYC obligations may be particularly difficult to meet in a situation where a financial institution that will take an action on behalf of a customer of an intermediary financial institution. Situations can arise, for example, where an intermediary financial institution may wish to provide a service or product to a customer of intermediary financial institution but not be able to provide the service themselves. The action can include, for example, a request to open an account, execute a financial transaction or take some other action. The intermediary financial institution may approach a Primary Financial Institution and request that the Primary Financial Institution provide the necessary service. The Primary Financial Institution may have a working relationship with the intermediary financial institution, but not have any knowledge of the ultimate customer. Taking an action on behalf of an unknown customer can result in an increase in Risk for the Primary Financial Institution.

What is needed is a method and system to minimize Risks associated with conducting transaction on behalf of a customer of an intermediary financial institution. coordinate and administer a certification that can receive and present information about a customer to any financial institution that will act on behalf of the customer. Compiled certification information should be situated in a known resource from which it can be conveyed to a compliance department or government entity and also be able to demonstrate to regulators that a Financial Institution has met standards relating to risk containment.

SUMMARY

Accordingly, the present invention provides methods and systems for managing Risk associated with a financial account initiated by an Intermediary institution. A computerized system can coordinate and administer a certification that can receive and present information about a customer to a financial institution requested to act on behalf of the customer. Compiled certification information should be situated in a known resource from which it can be conveyed to a compliance department or government entity and also be able to demonstrate to regulators that a Financial Institution has met standards relating to risk containment.

Risk related information descriptive of a customer of the Intermediary can be registered with a neutral entity and organized into a certification associated with the customer. An instruction can be received to convey the certification associated with the customer to a Primary Financial Institution after which the certification can be conveyed to the Primary Financial Institution.

Embodiments can include various ways to convey the certification, such as, for example, providing an indicator identifying the customer to the Primary Financial Institution and a network address at which the certification associated with the customer can be accessed. Access to the certification identified with the customer identification can also be authorized for the particular Primary Financial Institution.

In another aspect, embodiments can include performing a risk management clearinghouse search related to the customer and conveying the results of the risk management clearinghouse search to the Primary Financial Institution, such as, for example, with the conveyance of the certification.

The action relating to a financial account initiated by an Intermediary can include, for example: opening a financial account; transferring funds, investing funds or other type of transaction.

Once the certification is generated, embodiments can include ascertaining the completeness of the certification, such as by the neutral entity. In another aspect, embodiments can also include, keeping the name of the customer anonymous to the Primary Financial Institution.

If it is appropriate, embodiments can include receiving updated information relating to the certification and transmitting the updated information to a Primary Financial Institution that had previously received a certification relating to the customer.

In still another aspect, conveying the information descriptive of a customer can include storing the certification on a resource accessible via a particular network address and associating the certification with an identifier unique to the customer. The identifier and the network address can be transmitted to the Primary Financial Institution such that the Primary Financial Institution can access the resource and identify an appropriate certification. From the perspective of an Intermediary Financial Institution, information descriptive of a customer can be registered with a neutral entity, such as a risk management clearinghouse. When an Intermediary initiates a transaction with a Primary Financial Institution, the Intermediary can also issue an instruction to a neutral entity with information descriptive of a customer to convey the information to the Primary Financial Institution.

Other embodiments of the present invention can include a computerized system, executable software, or a data signal implementing the inventive methods of the present invention. The computer server can be accessed via a network access device, such as a computer. Similarly, the data signal can be operative with a computing device, and computer code can be embodied on a computer readable medium.

Various features and embodiments are further described in the following figures, drawings and claims.

DETAILED DESCRIPTION

Figure 1:
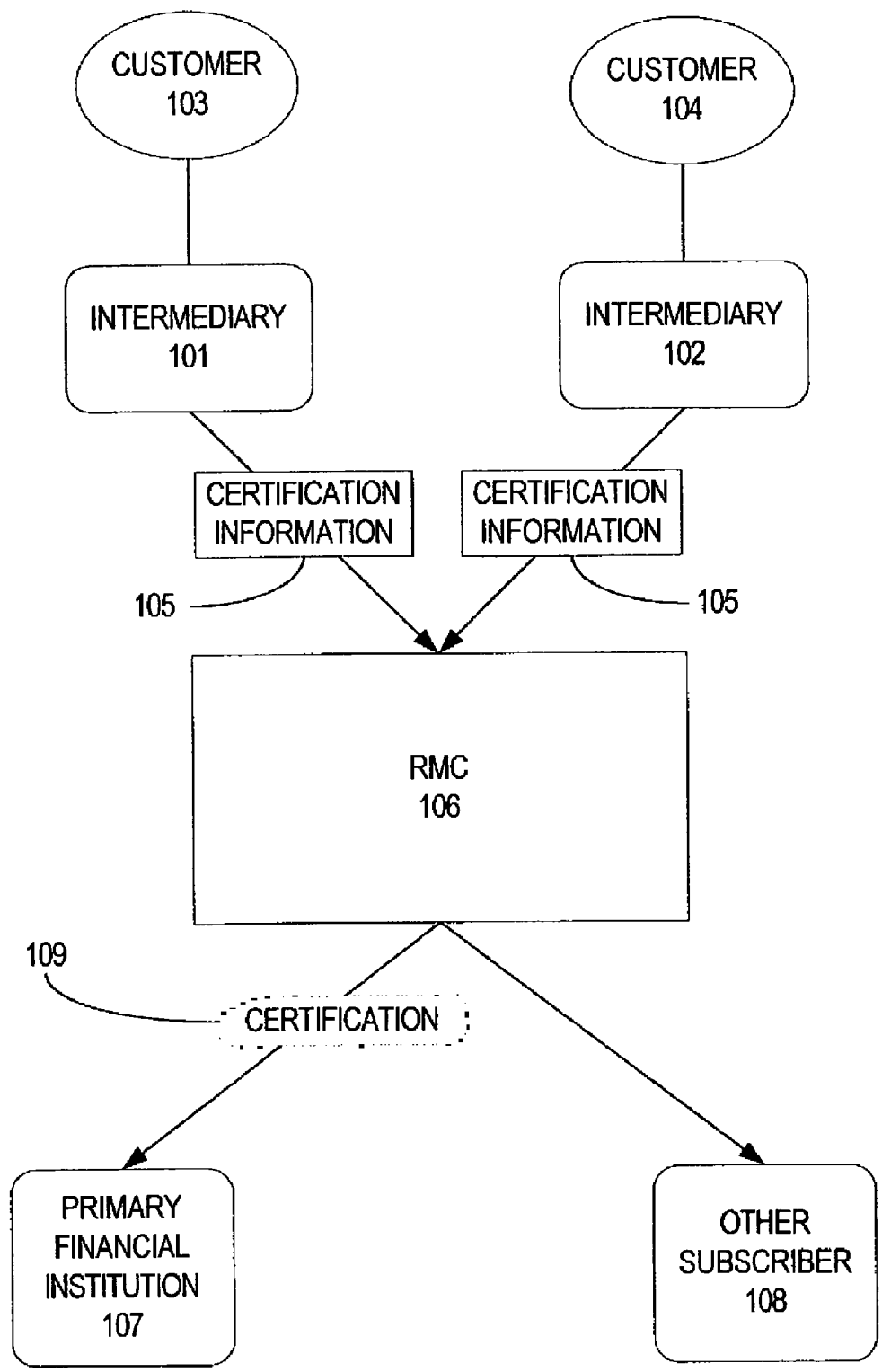
FIG. 1 illustrates a block diagram that can embody the present invention.

The present invention includes methods and systems for facilitating the transfer of information relating to risk management and KYC obligations. In particular, the present invention includes methods and systems for conveying information descriptive of a customer whose relationship with a Primary Financial Institution results from interaction with an Intermediary entity. An Intermediary can include any Financial Institution or other entity that requests that a Primary Financial Institution provide a service or product on behalf of a customer of the Intermediary. A Primary Financial Institution can include any Financial Institution approached by the Intermediary to provide such product or service.

Definitions

For the purposes of this application, the following definitions can apply:

Financial Institution: Financial Institution refers to any person, entity, company, corporation or statutory "person" in the business of providing Financial Transactions. As such, as used herein, a Financial Institution can collectively and individually include: Bank and non-bank financial institutions, including: investment banks; merchant banks; commercial banks; securities firms, including broker dealers securities and commodities trading firms; asset management companies, other hedge funds, mutual funds, credit rating funds, securities exchanges and bourses, institutional and individual investors, law firms, accounting firms, auditing firms, any institution the business of which is engaging in financial activities as described in section 4(k) of the Bank Holding Act of 1956, and other entities subject to legal and regulatory compliance obligations with respect to money laundering, fraud, corruption, terrorism, organized crime, regulatory and suspicious activity reporting, sanctions, embargoes and other regulatory risks and associated obligations.

Financial Transaction: a Financial transaction refers to any action that anticipates a transfer of money from a first set of one or more Transaction Participants to a second set of one or more Transaction Participants. Examples of Financial Transactions can include: investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions; a transaction involving any transfer of funds and: an insurance company, a credit card issuer, a trading exchange, a government regulator, a law enforcement agency, an investment and/or merchant bank, public and private financing, commodities and securities trading, commercial and consumer lending, asset management, a rating of corporations and securities, public and private equity investments, public and private fixed income investments, the listing of companies on securities exchanges and bourses; and employee screening.

Intermediary: Intermediary refers to a Financial Institution or other entity that requests that a Primary Financial Institution provide a service or product, or execute a Financial Transaction on behalf of a customer of the Intermediary.

Informational Artifact: Informational Artifact refers to a media item that contains information that can be interpreted into a humanly ascertainable form. Examples of Informational Artifacts include: a document, a news article, a news feed portion, a video segment, a newscast, a report, an agency listing, a list, a government publication, other identifiable publication, a sound byte, a sound recording, or other media item.

Primary Financial Institution: Primary Financial Institution refers to a Financial Institution executing a Financial Transaction.

Risks: Risks associated with a financial transaction can include factors associated with security risk, financial risk, legal risk, regulatory risk and reputational risk. A Security Risk refers to breach of a safety measure that may result in unauthorized access to a facility; unauthorized access to data; physical harm, including threat of immediate risk of harm to a person or goods. Financial Risk refers to factors indicative of monetary costs that the Risk Bearing Institution or a Transaction Participant may be exposed to as a result of a particular Financial Transaction. Monetary costs can be related to fines, forfeitures, costs to defend an adverse position, lost revenue, or other related potential sources of expense. Regulatory Risk refers to factors that may cause the Risk Bearing Institution or Transaction Participant to be in violation of rules put forth by a government entity or regulatory agency. Reputational risk relates to harm that a Risk Bearing Institution or Transaction Participant may suffer regarding its professional standing in an industry or the public eye. A Risk Bearing Institution and Transaction Participant can suffer from being associated with a situation that may be interpreted as contrary to an image of diligence, honesty and forthrightness.

Risks may be related to the duty to disclose material information, to report and possibly prevent: fraud, money laundering, foreign corrupt practices, bribery, embargoes and sanctions. Timely access to relevant data on which to base a regulatory or reputational Risk related action can be critical to conducting business and comply with regulatory requirements such as those set forth by the Patriot Act in the United States.

Risk Management Clearinghouse (RMC): RMC refers to computerized systems and methods for managing Risks and associating information and/or informational artifacts useful for quantifying Risk with a Risk subject, as more fully described in the related patent application Ser. No. 10/074,584 entitled "Risk Management Clearinghouse" filed Feb. 12, 2002, and U.S. patent application Ser. No. 10/021,124 entitled "Risk Management Clearinghouse" filed Oct. 30, 2001.

Risk Quotient: Risk Quotient refers to a quantitative value of an amount of Risk, a Risk Quotient can be based upon a weighted algorithm applied to the Risk criteria and informational artifacts.

Subscriber: Subscriber refers to any person or entity authorized to access an RMC system 106.

Transaction Participant: Transaction Participant refers to a person who will partake in a Financial transaction.

Elements

Referring now to FIG. 1, a block diagram with elements included in some embodiments of the present invention is illustrated. A neutral entity, such as a risk management clearinghouse (RMC) 106, can act as a registry of information relating to a customer of an Intermediary 101-102 by receiving and maintaining certification information 105, such as, for example an Informational Artifact, that is descriptive of a customer 103-104 and related to the management of Risks. A neutral entity can be any entity that is not under the control of either the Intermediary or the Primary Financial Institution. A neutral entity may, for example, be under a contractual obligation to an Intermediary or Primary Financial Institution, but will generally be able to operate independently and not be under obligation to act upon managerial instruction initiated by either the Intermediary or the Primary Financial Institution. An RMC 106 or other neutral entity can register information by receiving the information and associating the information with an identifier of a customer. Association of information can be according to any available technique, such as a relational or hierarchical database, key fields, indexing or other methods.

One or more certifications 109 containing predefined fields of information descriptive of a customer 103-104 can be made available to a Primary Financial Institution 107 or other subscriber 108 who wishes to act responsive to needs or requests of the customer 103-104. In particular, a certification 109 can be useful to manage risk by fulfilling KYC obligations, such as those set forth by the Financial Action Task Force (FATF), the USA PATRIOT Act or other authority or obligation.

For example, an Intermediary may request that a Primary Financial Institution open an account and/or execute a financial transaction on behalf of a customer of the Intermediary. A financial account can be an account for investing, trading, transferring, receiving or otherwise handling finances. The Primary Financial Institution may not be able to meet or interview the customer, or take other actions involving the customer according to normal due diligence procedures. However, the Intermediary 101-102 can arrange for pertinent information, such as, for example, in the form of certificate information 105, to be put on record with an RMC 106, and authorize the RMC 106 to transmit, or otherwise release to the Primary Financial Institution the certificate information 105. In some embodiments, the release of the information 105 can take the form of a predefined certification 109 containing information useful to ascertaining a level of Risk that may be associated with performing a transaction for the customer, such as, for example, information routinely requested during an account opening procedure, or other more general information.

A predefined certification 109, or other release of information 105 can include information relating to any risk variable, such as, for example: data that can cause a risk level to change; identification of who is a beneficiary to a transaction; a sovereign state involved; a geographic area involved; citizenship of the customer; a shell bank involved; a correspondent account involved; a political figure or a person close to a political figure; a history of fraud, embargoes, sanctions, or other compromising situation; or other information.

Some embodiments can include a database with data fields to hold information included in the certification 109. For example, the database fields can include datum which identify a home and business address for the customer; an employer of the customer; a means of identification, such as a passport, driver's license, birth certificate, or other official document, as well as data gleaned form such a document, such as a numeric identifier; a history of criminal convictions or investigations; a date of birth; a place of birth; parents names and citizenship; alternate names the customer has ever been known by, any association with specific organizations listed; any family members associated with specific organizations; or other information.

Some embodiments can include a document image of certification 109, such as for example, a .pdf file created with Adobe Acrobat, or other image. In some embodiments, images can be desirable because the image can convey a document as submitted and diminish any probability of information being compromised.

Other risk variable information relating to the customer can include whether the customer 103-104 is listed on, or otherwise associated with an entity listed on, a formalized list generated by an authority, such as, for example: a list generated by the Office of Foreign Assets Control (OFAC) including their sanction and embargo list, a list generated by the U.S. Commerce Department, a list of international "kingpins" generated by the U.S. White House, foreign Counterpart list, U.S. regulatory actions or other information source such as a foreign government, U.S. adverse business-related media reports, U.S. state regulatory enforcement actions, international regulatory enforcement actions, international adverse business-related media reports, a list of politically connected individuals or politically identified persons, a list of military leaders, a list of U.S. and international organized crime members and affiliates, a list put forth by the Financial Action Task Force (FATF), a list of recognized high risk countries, or other source of high risk variables. Court records or other references relating to fraud, bankruptcy, professional reprimand or a rescission of a right to practice, suspension from professional ranks, disbarment, prison records or other source of suspect behavior can also be an important source of information. Of additional interest can be information indicative that a customer is not a high risk, such as, a list of corporations domiciled in a G-7 country, or a list of entities traded on a major exchange.

A RMC search can include a search of the risk variable information and sources listed above and any other information source related to Risks that can be made available to a data search. Results of a risk management clearinghouse search can be included with other information gathered that relates to a customer.

Some embodiments can include a predefined certification 109. The predefined certification 109 can include predetermined or standardized fields of information. Standards can be useful in that all parties in setting industry norms and accepted practices.

In another aspect, in some embodiments, a RMC 106 or other neutral entity can perform a check to ascertain that all agreed upon information has been included in the customer certificate information 105 received and a certification 109 generated is complete. Still other embodiments can allow the veracity and completeness of certificate information 105 to be left to efforts of the source of the information and not to the RMC 106, wherein the RMC 106 acts as a gatherer and compiler of information. Another variation can include supplying information and/or informational artifacts which are supportive of the veracity of information supplied in a certification 109. Still additional embodiments can allow the RMC 106 to guarantee or otherwise vouch for accuracy of information supplied.

Some embodiments can also include a certification 109 with an indication that a customer 103-104 has been researched by a RMC 106 according to predetermined procedures involving specified queries of predetermined risk variable sources, such as those listed above. Variations can include information identifying a customer, or allow the name of a customer 103-104 to remain anonymous to the Primary Financial Institution 107 or other subscriber 108, wherein the subscriber 107-108 will only receive answers to specific questions relating to the customer 103-104 or an indication that a query of risk variables associated with the customer 103-104 has not returned any results representative of a high risk. In such cases, a customer 103-104 may be identified by a customer ID number or other identifier that may not be significant outside of the relationship between the Intermediary 101-102 and the subscriber 107-108.

Predetermined procedures that result in a risk management certificate can include a search of risk variables, such as those listed above, which relate to a customer 103-104. In some embodiments, results from a risk variable search can be forwarded to the subscriber financial institution 107-108 and/or the Intermediary 101-102 involved. Results can include, for example, informational data, Informational Artifacts, a summary of the contents of Informational Artifacts, images, or other data. Embodiments can also include a statement or other indication from the RMC 106 indicating that a search has been conducted, the terms of the search and an indication of the results of the search. The indication of the results of the search can include for example, a quantitative value, such as a Risk Quotient, which is indicative of an amount of Risk that is associated with a particular Financial Transaction, Transaction Participant or other risk subject.

Embodiments can also allow the indication of the results to include a subjective rating of an amount of risk and/or an objective statement describing the search results. A subscriber rating can include, for example, a risk quotient or other scaled rating of risk. An objective statement can include, for example, listed terms that were searched and an indication that no negative material was returned from the search. Essentially, the objective statement can be packaged as an indication that the RMC 106 has not discovered any reason, from a risk management standpoint, not to proceed with a transaction involving the customer 103-104.

Terms that are searched can include, sources of information for risk variable related information such as government lists and the like, such as those listed above. Terms can also include phrases, words, relationships and other criteria utilized in a query and any data scrubbing variations that may have been utilized.

An Intermediary 101-103 can also agree that it will notify an RMC 106 and/or any subscribers 107-108 of any change in facts or circumstances previously certified or contained in certification information 105. Similarly, a RMC 106 can perform an alert service that will periodically or continuously, search on terms related to a customer 103-104, or a risk variable related to a customer 103-104, and notify an interested party, such as, for example, a subscriber 107-108 or an Intermediary 101-102 of any newly discovered information relating to the customer 103-104.

A Primary Financial Institution 107 that is on record with an RMC 106 as being interested in a customer can receive delivery of information relating to a customer via an electronic document, remotely printed document, facsimile, or hardcopy generated and physically delivered or other means. A RMC 106 can also be utilized to notify appropriate parties of administrative obligations such as, for example, notice of a change in facts contained in a certification 109.

Risk management procedures can establish that reporting information required to generate a certification 109 is voluntary for a customer 103-104; however failure to provide information necessary to complete a certification 109 may preclude the establishment or continuation of intermediary accounts with the subscriber institution 107 or dealings with another subscriber 108.

In addition to a Primary Financial Institution 107, other subscribers 108 can include, for example: a regulator; a money transfer agency; bourse; an institutional or individual investor; an auditing firm; a law firm; any institution or entity subject to legal and regulatory compliance obligations with respect to money laundering, fraud, corruption, terrorism, organized crime, regulatory and suspicious activity reporting, sanctions, embargoes and other regulatory risks and associated obligations; or other entity.

Similarly, a financial transaction can include investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

Embodiments can include certification information 105 that is received from an Intermediary 101-102 in any form that can accurately convey information necessary to complete a certification 105. For example, information can be input into a graphical user interface (GUI), submitted via hard copy, facsimile, scanned image, or any other form of information conveyance. The RMC 106 can store the certification information 105 and convey it upon request, such as in the form of a certificate generated.

Similarly, certification information 105 can be retrieved by a respondent Primary Financial Institution 107 or other subscriber 108 using any available mechanism for conveying information, including, but not limited to: a scanned image, database record retrieval, a text file, facsimile, hard copy, data stored on a computer readable medium, or other mechanism.

Information 105 relating to and included in certifications 109 can be aggregated into a searchable data storage structure. Gathering data into an aggregate data structure, such as a data warehouse, allows a RMC 106 make the data readily available for processing a risk management search associated with a transaction involving a customer 103-104. Aggregated data can also be scrubbed or otherwise enhanced to aid in performing searches.

In some embodiments involving the enhancement of data, data scrubbing can be utilized to implement a data warehouse comprising the aggregate data structure. Various data scrubbing routines can be utilized to facilitate aggregation of risk variable related information. The routines can include programs capable of correcting a specific type of mistake, such as an incomprehensible street address, or rectify a full spectrum of commonly found database flaws. Rectifying database flaws can include, for example, adjusting field alignment by picking up misplaced data and moving it to a correct field or removing inconsistencies and inaccuracies from like data.

Other scrubbing routines can be directed towards specific legal issues, such as money laundering or terrorist tracking activities. For example, a scrubbing routine can be used to facilitate various different spelling of one name. In particular, spelling of names can be important when names have been translated from a foreign language into English. A data scrubbing routine can facilitate risk variable searching for multiple spellings of an equivalent name or other important information. Such a routine can enhance the value of the aggregate data gathered and also help correct database flaws. Scrubbing routines can improve and expand data quality more efficiently than manual mending and also allow a subscriber 107-108 to quantify best practices for regulatory purposes.

Figure 2:
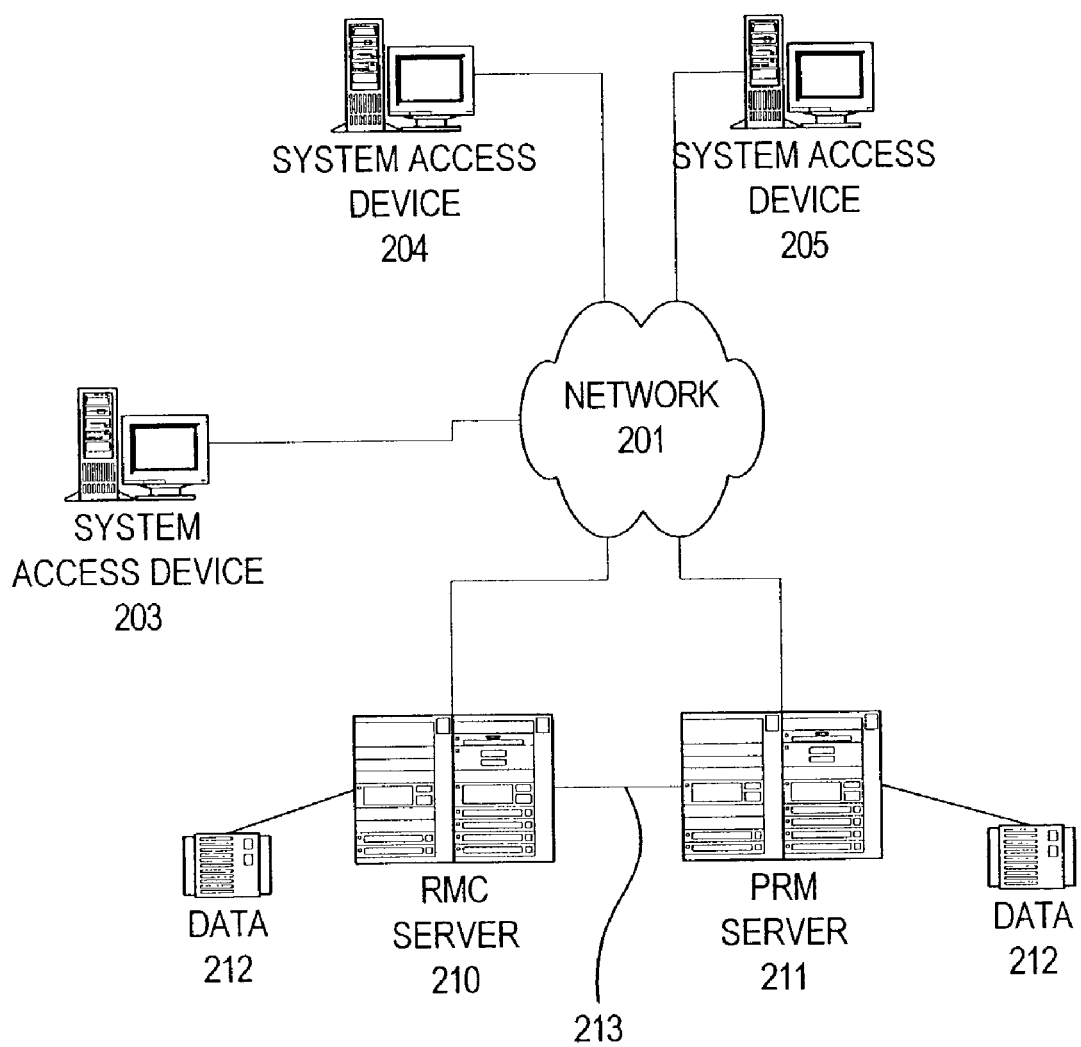
FIG. 2 illustrates a network of computer systems that can embody an Intermediary Registry.

Referring now to FIG. 2, a network diagram illustrating some embodiments of the present invention is shown 200. An automated RMC 106 can include a computerized RMC server 210 accessible via a distributed network 201 such as the Internet, or a private network. A party interested in risk management, such as, for example, an Intermediary 101-102, a Primary Financial Institution 107 or other subscriber 108 can use a computerized system or network access device 203-205 to receive, input, transmit or view information processed in the RMC server 210. A protocol, such as the transmission control protocol internet protocol (TCP/IP) can be utilized to provide consistency and reliability.

In addition, some embodiments can include a proprietary risk management (PRM) server 211 which can access the RMC server 210 via the network 201 or via a direct link 213, such as a T1 line, digital subscriber line (DSL), or other high speed pipe. The PRM server 211 can in turn be accessed by an affiliated user via a system access device 203-205 and a communications network 201, such as a local area network, or other private network, or even the Internet, if desired. For the purposes of this application, any function or reference to an RMC server 210 can also include a PRM server 211, except that the PRM server 211 can also contain proprietary information that will not be shared outside of an organization except as allowed by prevailing applicable law. In addition, in some embodiments, a PRM server 211 may be utilized to calculate risk quotients or other subjective valuations which an RMC server 210 may be limited from doing by an RMC provider.

A system access device 203-205 utilized to access the RMC server 210 can include a processor, memory and a user input device, such as a keyboard and/or mouse, and a user output device, such as a display screen and/or printer. A system access device 203-205 can communicate with the RMC server 210 to access data and programs stored at the RMC server 210. A system access device 203-205 may interact with the RMC server 210 as if the RMC server 210 were a single entity in the network 200. However, the RMC server 210 may include multiple processing and database sub-systems, such as cooperative or redundant processing and/or database servers that can be geographically dispersed throughout the network 201.

The RMC server 210 can include one or more databases 212 storing data relating to risk management, and in particular to certification of a customer 103-104 presented by an Intermediary 101-102. The RMC server 210 may interact with and/or gather data from an operator of a system access device 203-205 or other source.

Typically a user will access a RMC server 210 using client software executed at a system access device 203-205. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the RMC server 210 to the system access device 203-205 and executed at the system access device 203-205 as part of RMC risk management software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
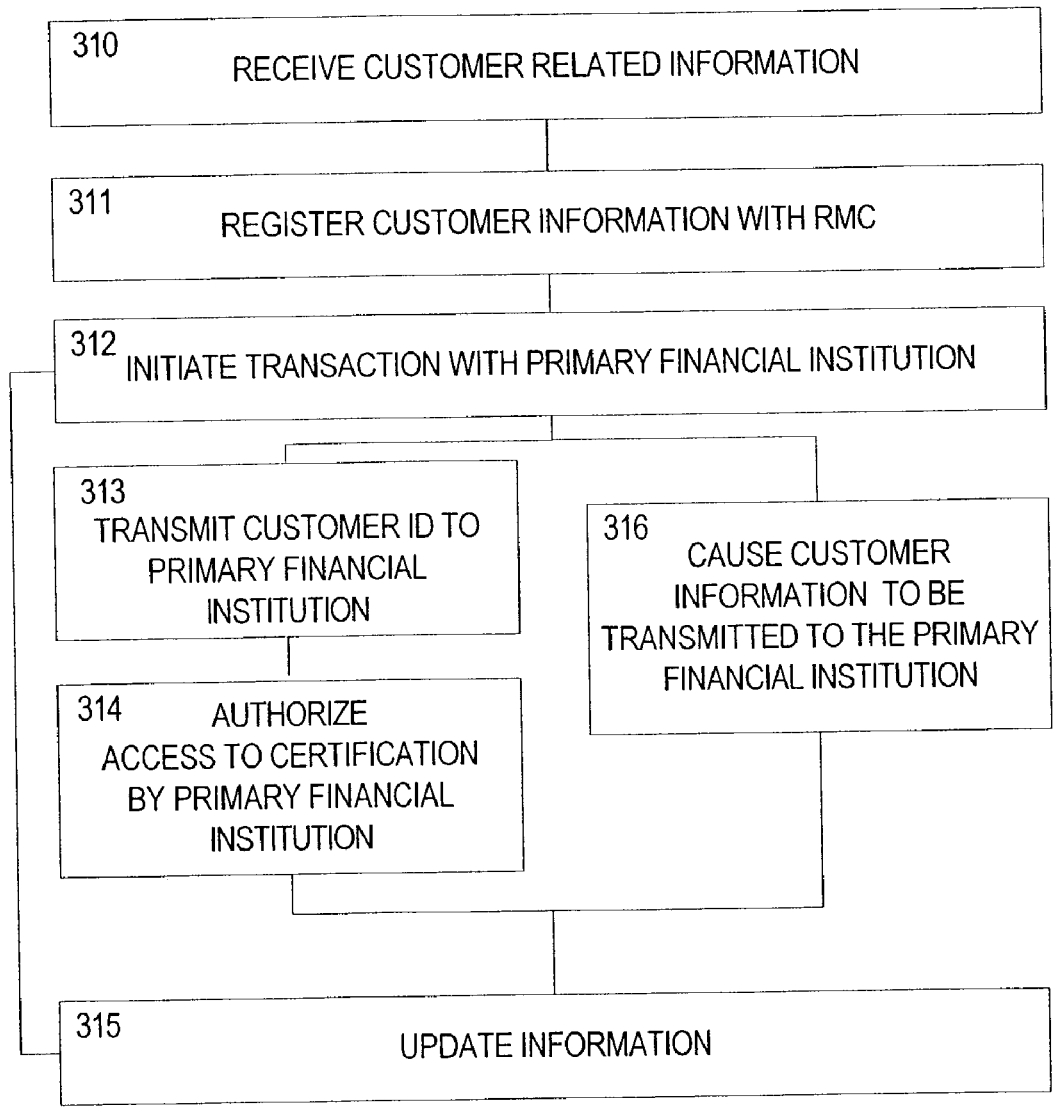
FIG. 3 illustrates a flow of exemplary steps, from the perspective of an Intermediary, which can be executed while implementing the present invention.

Referring now to FIG. 3, steps that can be performed while practicing the present invention are illustrated. From the perspective of an Intermediary 101-102, customer certification information relating to a customer 103-104 can be received 310 and the customer certification information 105 registered 311 with an RMC 106. Embodiments can also include a customer 103-104 or other entity providing the information directly to the RMC 106.

The Intermediary 101-102 can initiate a transaction 312 with a Primary Financial Institution 107 or other subscriber 108 and cause the registered information to be conveyed to the Primary Financial Institution 107. The conveyance of the information can be accomplished by any convenient means of communication. Embodiments include electronic transmission of a customer identifier 313 or other indication descriptive of the customer, to the Primary Financial Institution 107. In addition, the Intermediary 101-102 can authorize access 314 to a certification 109 by a subscriber 107-108. The Intermediary 101-102 can also update any customer information 315 and initiate another transaction 312.

Embodiments can also include an Intermediary 101-102 causing the information to be transmitted to the Primary Financial Institution 107 or other entity 108. The Intermediary can cause the information to be sent via any available method of communication, such as, an electronic message, a facsimile, a voice message, a batch feed, hardcopy instruction, or other communication.

Figure 4:
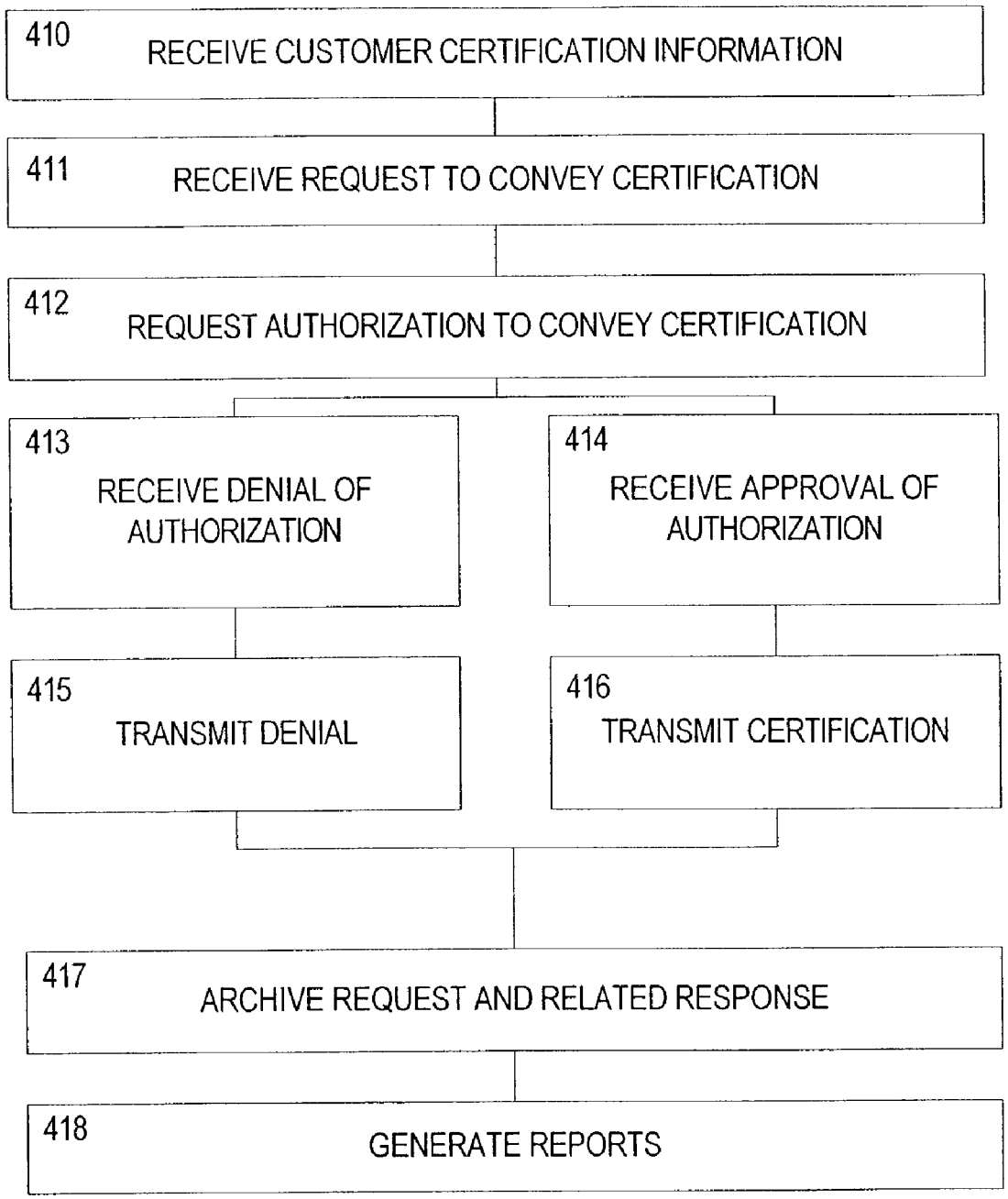
FIG. 4 illustrates a flow of exemplary steps, from the perspective of a risk management clearinghouse, which can be executed by a user while implementing the present invention.

Referring now to FIG. 4, from the perspective of an RMC 106, the RMC 106 can receive customer certification information 410 and also receive a request to convey a particular certification 411, from a requester, such as a request from a Primary Financial Institution 107. In turn, the RMC 106 can request authorization to convey the certification 412 from a party designated to grant such authorization. For example, authorization may be granted to a person employed by the Intermediary 101-102.

In response to the request for authorization to convey a certification 412, the RMC 106 may receive a denial of required authorization 414, in which case the RMC 106 will transmit a denial 415 for the request for a certification 109. Alternatively, the RMC 106 may receive an approval for the request for authorization 414 and subsequently transmit the certification 109 to the requestor 416.

Some embodiments allow conveyance of a certification without an authorization step. Authorization can be in essence waived or implied by supplying the certification information 105 to the neutral entity, such as the RMC 106.

A request for a certification 109 can be archived, along with a related response 417. The RMC 106 can also be utilized to generate one or more reports relating to a request for certification and associated action resultant to the request 418.

Figure 5:
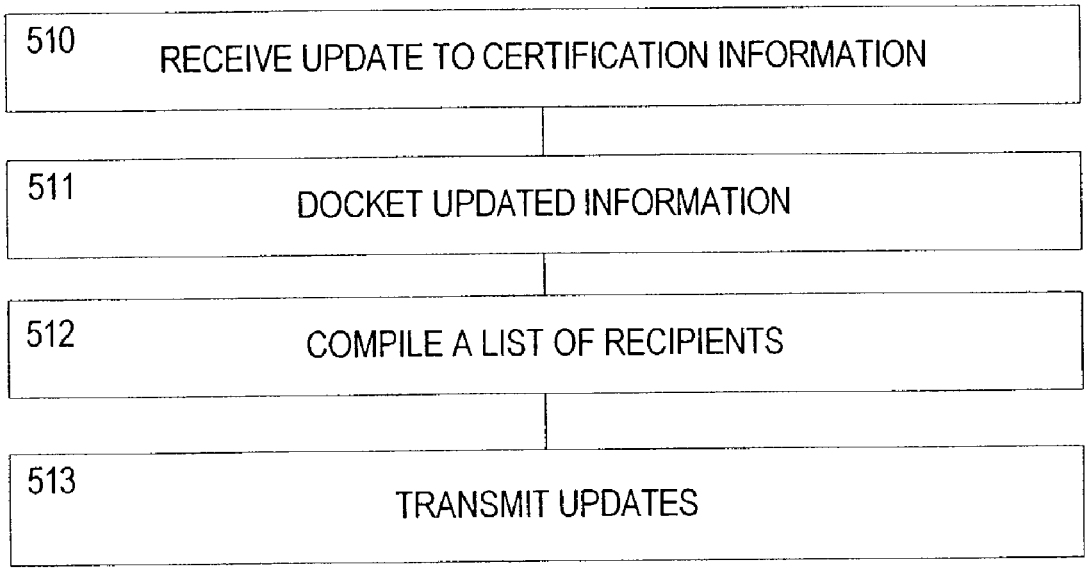
FIG. 5 illustrates a flow of exemplary steps, from the perspective of updating information, which can be executed by a user while implementing the present invention.

Referring now to FIG. 5, steps relating to updating certification information which can be implemented in various embodiments of the present invention are illustrated. A RMC 106 can receive updated information related to certification 510, such as a change in risk variable information, or other data change. Received updates can be docketed 511 to facilitate in processing. Any information included in the updates can be incorporated into a data source 212 associated with generating the certifications 109. A list of recipients who should receive the updates can also be compiled 512. Recipients can include, for example, Primary Financial Institutions 107 or other subscribers 108 that have received a previous certification relating to the customer 103-104 involved. Updates can be transmitted or otherwise conveyed to the members included on the list of recipients 513.

Figure 6:
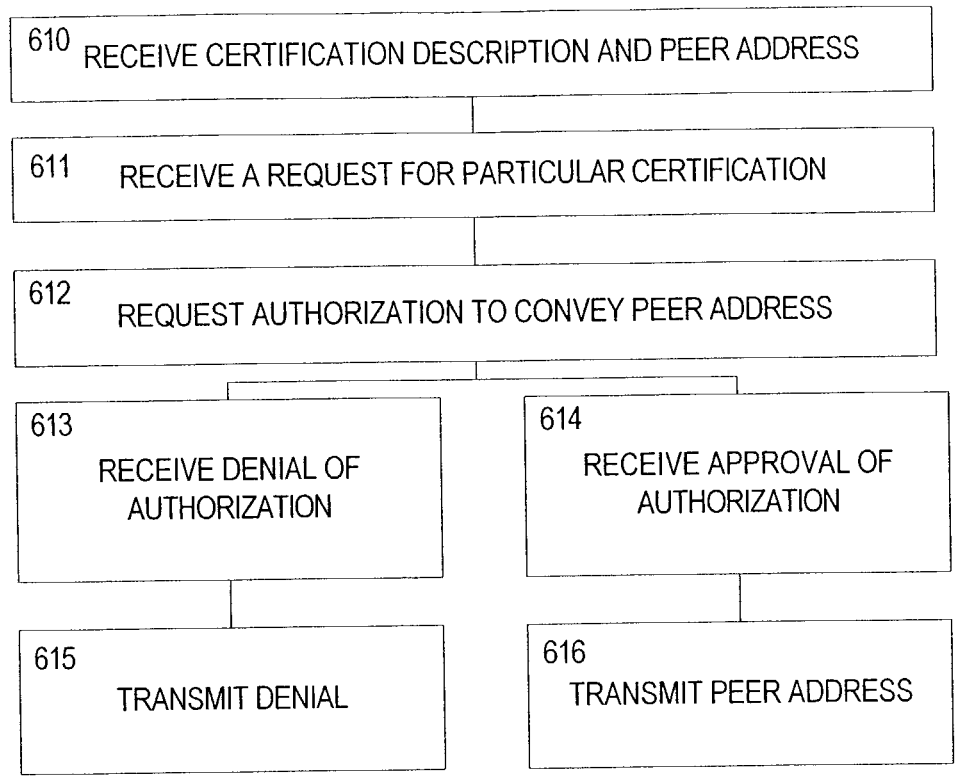
FIG. 6 illustrates a flow of exemplary steps relating to a certification available via a network resource, the steps can be executed by a user while implementing the present invention.

Referring now to FIG. 6, embodiments can include a certification 109 stored on an electronic storage device that can be made accessible to a Primary Financial Institution 107, or other party, that needs to access the certification. The Primary Financial Institution 107 receives a description of a customer, such as, for example, a customer ID number and a network address at which the certification can be accessed 610. The Primary Financial Institution 107 can retrieve a certification associated with the customer ID. A network address can include an internet protocol address, a uniform resource locator, a peer to peer designation, or any other mechanism which allows for the identification of a resource and communication with the resource.

The RMC 106 can receive a request from a subscriber 107-108 to convey a particular certification 611 and respond by requesting authorization from an associated Intermediary 101-102 to convey a network address of a resource containing the certification 612. If the authorization is denied 613, the RMC can transmit a denial of the request for the certification 615. If the RMC 106 receives authorization to convey the certification information 614, the RMC 106 can transmit or otherwise convey the peer address 616 of a resource containing the certification and from which the certification information can be gathered.

Figure 7:
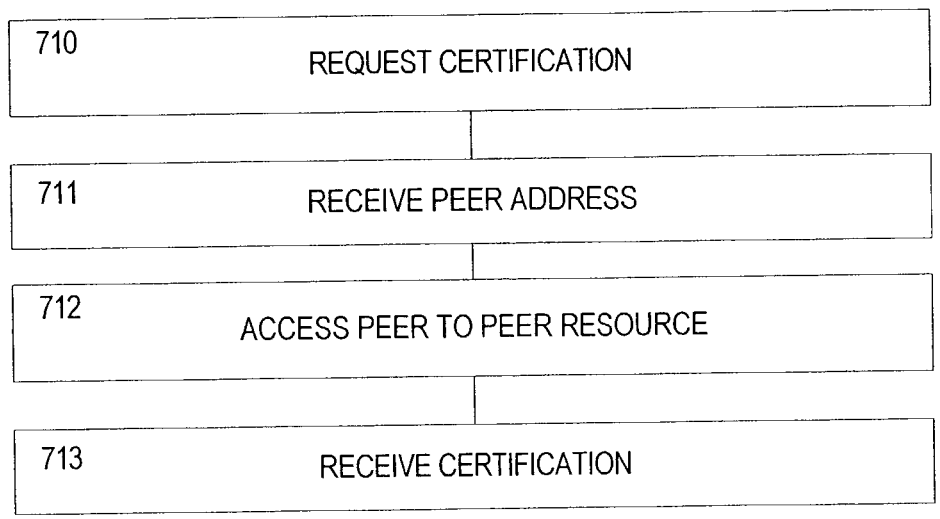
FIG. 7 illustrates a flow of exemplary steps relating to accessing a certification on a network resource that can be executed by a user while implementing the present invention.

Accordingly, as illustrated in FIG. 7, a subscriber, such as a respondent Financial Institution 107 or other entity 108, can request certification information 710 from the RMC 106 and receive a peer address 711 of a resource that contains the certification and is available via a network 201 from which the information can be received. A subscriber 107-108 can access a resource located at the network address conveyed by the RMC 106 and receive the certification information 713. Embodiments can also include transmitting, or otherwise providing a password or other security mechanism which can be used to further control access to a certification 109.

Figure 8:
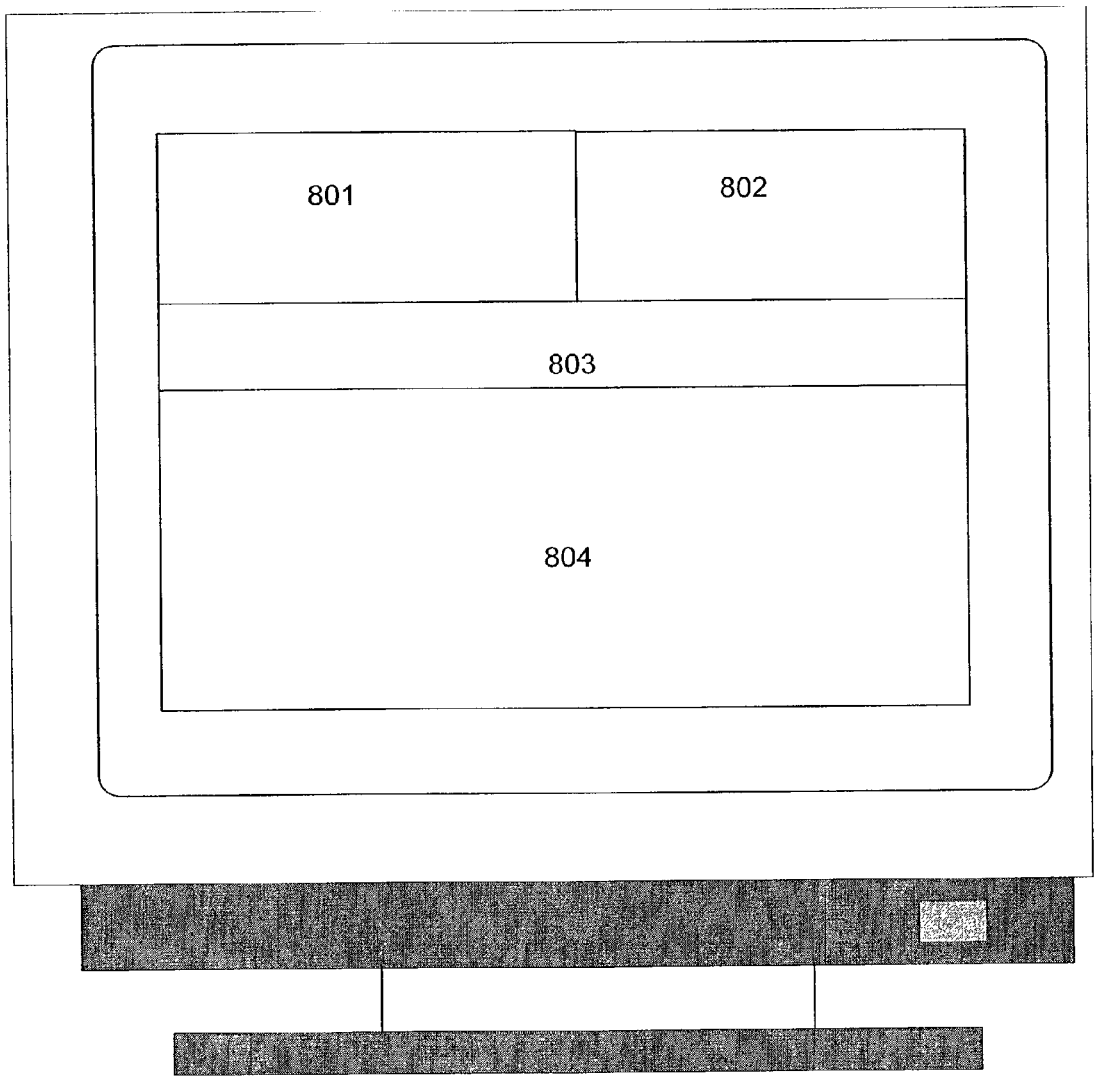
FIG. 8 illustrates an exemplary graphical user interface that can implement various aspects of the present invention.

Referring now to FIG. 8, an exemplary GUI 800 that can be utilized while practicing the present invention is illustrated. A portion of a display 800 can display information that relates to an Intermediary 801, such as an initiating bank, or other Financial Institution. Another portion of the display can include a description of a subscriber 802. A portion can also contain information descriptive of a particular requested transaction 803 such as, for example, an amount of money involved in the transaction, a time frame for the transaction to be consummated, or other details. A certification 109 or some subset of certification information 105 can be displayed in still another portion of the display 804. Information displayed can include, for example, predetermined fields of information related to a certificate, as discussed in more detail above, or an open narrative, as appropriate.

Figure 9:
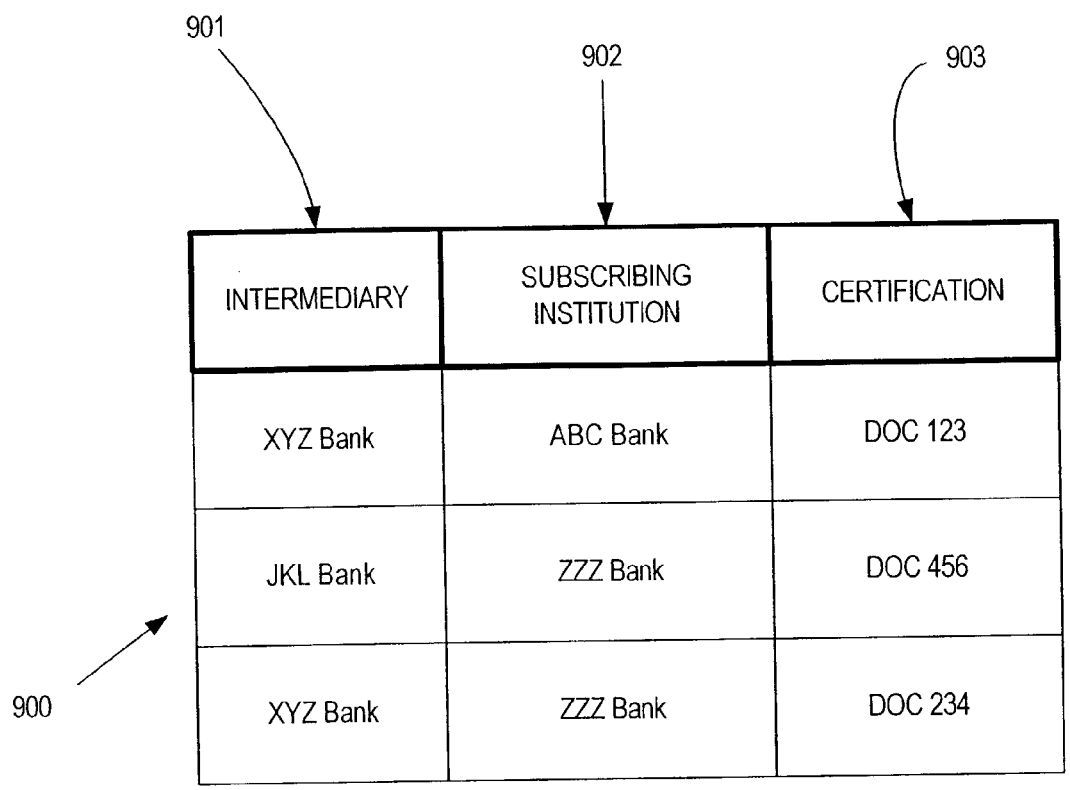
FIG. 9 illustrates an exemplary data structure that can be utilized to implement certain aspects of the present invention.

Referring now to FIG. 9, a portion of a design of a database that can be utilized while implementing the present invention is illustrated. The database 900 can include a field containing data descriptive of an Intermediary 901 as well as a field containing data descriptive of a subscriber 902. Another field can hold descriptive of a related certification 903.

A number of embodiments of the present invention have been described. Nevertheless, it will be understood that various modifications may be made without departing from the spirit and scope of the invention. For example, hard copy documents can be gathered and scanned into the RMC 106 such that the scanned image can be forwarded to a subscriber as appropriate. Other embodiments can include certification data that will expire and be locked after a set period of time has elapsed, such as, for example a period for which the data will remain current. Locked data can include for example, data that is encrypted, subject to a password, or otherwise made inaccessible. Accordingly, other embodiments are within the scope of the following claims.

What is claimed is:

1. A computer-implemented risk management customer registry method, comprising:

receiving in a computer risk related information descriptive of a customer of an intermediary financial institution for a proposed transaction with a primary financial institution;

performing a risk management clearinghouse search related to the customer;

searching for additional customer business related information, the searching performed by the computer, the searching including searching a list of business related information generated by a regulatory authority;

generating by the computer a customer certification from a neutral entity independent of the primary financial institution and the intermediary financial institution comprising the risk related information for the customer based at least in part on results of the risk management clearinghouse search and the searching for additional customer business related information;

receiving in the computer an instruction to convey the customer certification to the primary financial institution;

providing an indicator identifying the customer to the primary financial institution;

transmitting a network address at which the certification can be accessed according to the indicator identifying the customer; and conveying the customer certification to the primary financial institution by authorizing access to the certification.

2. The method of claim 1 wherein the certification is transmitted prior to the primary financial institution opening an account to the benefit of the customer of the intermediary financial institution.

3. The method of claim 1 wherein the certification is transmitted prior to execution of a financial transaction by the primary financial institution,
wherein the financial transaction is associated with the customer.

4. The method of claim 1 additionally comprising the step of ascertaining the completeness of the certification information conveyed.

5. The method of claim 1 wherein a name of the customer, is kept anonymous to the primary financial institution.

6. The method of claim 1 additionally comprising the steps of
receiving updated information relating to the certification and
transmitting the updated information to the primary financial institution that had previously received the certification relating to the customer.

7. The method of claim 1 wherein conveying the certification comprises the steps of:
storing the certification on a resource accessible via a particular network address;
associating the certification with an identifier unique to the customer; and
transmitting the identifier and the network address to the primary financial institution.

8. A risk management customer registry system comprising:
a computer server accessible with a system access device via a communications network; and
executable software stored on the server and executable on demand, the software operative with the server to cause the server to:
receive in a computer risk related information descriptive of a customer of an intermediary financial institution, for a proposed transaction with a primary financial institution;
perform a risk management clearinghouse search related to the customer;
search for additional customer business related information, the searching performed by the computer, the searching including searching a list of business related information generated by a regulatory authority;
generate by the computer a customer certification from a neutral entity independent of the primary financial institution and the intermediary financial institution comprising the risk related information for the customer based at least in part on results of the risk management clearinghouse search and the searching for additional customer business related information;
receive in the computer an instruction to convey the customer certification to the primary financial institution;
provide an indicator identifying the customer to the primary financial institution;
transmit a network address at which the certification can be accessed according to the indicator identifying the customer; and
convey the customer certification to the primary financial institution by authorizing access to the certification.

9. A non-transitory processor-readable medium having processor-executable program instructions residing thereon, wherein the processor-executable program instructions are issuable by a processor to:
receive in a computer risk related information descriptive of a customer of an intermediary financial institution, for a proposed transaction with a primary financial institution;
perform a risk management clearinghouse search related to the customer;
search for additional customer business related information, the searching performed by the computer, the searching including searching a list of business related information generated by a regulatory authority;
generate by the computer a customer certification from a neutral entity independent of the primary financial institution and the intermediary financial institution comprising the risk related information for the customer based at least in part on results of the risk management clearinghouse search and the searching for additional customer business related information;
receive in the computer an instruction to convey the customer certification to the primary financial institution;
provide an indicator identifying the customer to the primary financial institution;
transmit a network address at which the certification can be accessed according to the indicator identifying the customer; and
convey the customer certification to the primary financial institution by authorizing access to the certification.

* * * * *